Nov. 29, 1966 H. G. CRAMER 3,287,851
EXTENSIBLE PLANT PROTECTOR HAVING MEANS FOR EVENLY
DISTRIBUTING ITS COLLECTED WATER
Filed Oct. 21, 1965 2 Sheets-Sheet 1
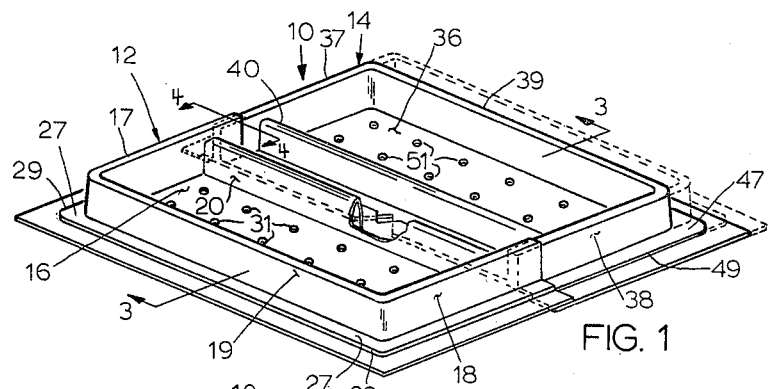
FIG. 1
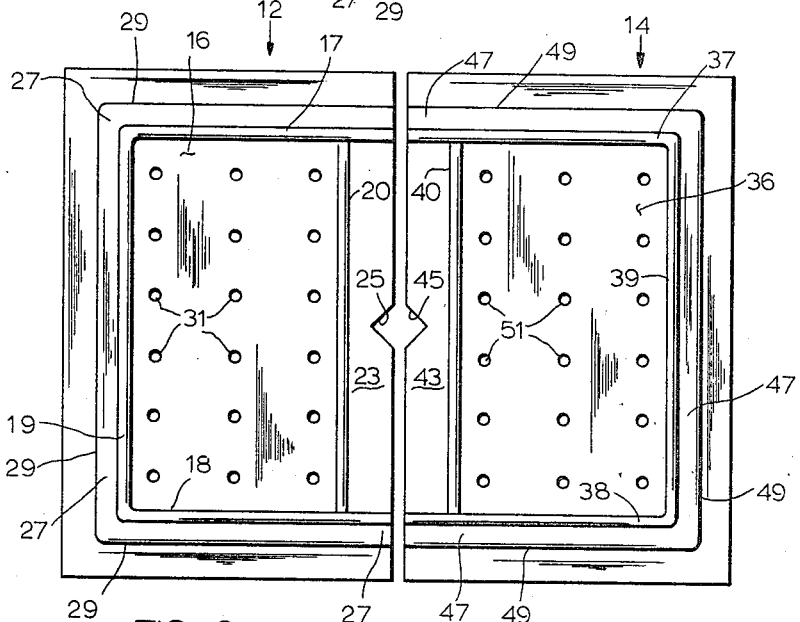
FIG. 2
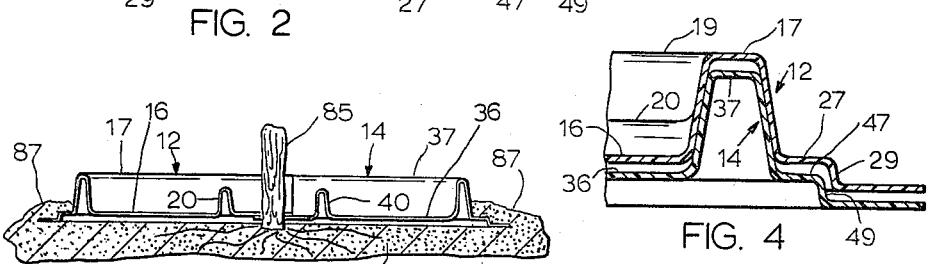
FIG. 3
FIG. 4
HENRY GUY CRAMER
INVENTOR.
BY
Richard J Rawling
ATTORNEY Nov. 29, 1966  H. G. CRAMER  3,287,851
EXTENSIBLE PLANT PROTECTOR HAVING MEANS FOR EVENLY
DISTRIBUTING ITS COLLECTED WATER
Filed Oct. 21, 1965  2 Sheets-Sheet 2

HENRY GUY CRAMER
INVENTOR.

BY
Richard J Rawling
ATTORNEY

United States Patent Office 3,287,851
Patented Nov. 29, 1966

---

3,287,851
EXTENSIBLE PLANT PROTECTOR HAVING MEANS FOR EVENLY DISTRIBUTING ITS COLLECTED WATER
Henry Guy Cramer, Manatee County, Fla., assignor to Salvatori Industries, Inc., Sarasota, Fla., a corporation of Florida
Filed Oct. 21, 1965, Ser. No. 499,607
8 Claims. (Cl. 47—25)

The present invention relates generally to improvements in plant and tree protectors, and it has specific relation to an extensible protector capable of adjustment to allow for the growth of the stem or trunk of the plant or tree and providing extended protection for the spreading ends of the growing roots.

Heretofore, it has been customary to provide plant protectors in the form of unitary mulch pads adapted to encircle the stem or trunk of the plant or tree and to channel its collected water towards the opening surrounding said stem or trunk.

There have also been provided plant protectors in the form of corrugated sheets of material, such as plastic or impregnated papers, having spaced openings therethrough for distributing the collected water to the roots therebelow. These sheets were not only used to prevent the growth of weeds around the stem or trunk of the plant or tree, but were also designed to prevent the plant berries from contacting the ground.

None of these prior art plant protectors was extensible or adjustable to allow for the normal growth of the stem or root of the plant or tree. None of such plant protectors was capable of covering an enlarged area to provide protection for the tender ends of the spreading roots while at the same time being capable of equally distributing the collected water to such roots.

With the present invention all of the aforesaid disadvantages have been obviated and there is provided an adjustable plant protector made up of two slidable sections which can be fitted closely around the stem or trunk of the plant or tree at the time of installation, and which can be extended to enlarge the original stem or trunk opening and provide protection for the outer ends of the growing and spreading roots while at the same time assuring an even distribution of collected water over the entire root area covered by said protector.

An object of the present invention is to provide a simple, inexpensive and efficient plant protector adapted to be made in a single mold and then severed along its median transverse axis to provide two separate trays capable of being fitted telescopically to provide a slidably adjustable plant protector that will allow for the growth of the stem or trunk about which it was initially fitted.

Another object of the invention is to provide a permanent type of plant protector, which will not be affected by the elements, and which can be used over and over again at each new succeeding planting time.

A further object of the invention is to provide a plant protector which is readily separable so that it can be easily and quickly removed from the plant or tree when no longer required without damaging said plant or tree or destroying said plant protector.

A further object of the invention is the provision of means for collecting the water falling on said protector and evenly distributing it over the ground area covered thereby.

Another object of the invention is to provide an extensible plant protector which is not only adjustable to provide for the growth of the stem or trunk of the plant or tree being protected, but is also capable of being extended over an enlarged area whereby the tender ends of the spreading roots will receive protection over a longer period of time while receiving their proper proportion of collected water.

A further object of the invention is the provision of a plant protector which is provided with a plurality of individual compartments or cells for collecting water and for distributing the same evenly over the entire root area covered thereby.

Other and further objects and advantages of the invention, which result in simplicity, economy and efficiency, will be apparent from the following detailed description, reference being had to the accompanying drawings, forming a part hereof, wherein like numerals indicate like parts, in which:

FIGURE 1 is a perspective view of an assembled plant protector made in accordance with the principles of the invention;

FIGURE 2 is an enlarged top plan view of the plant protector of FIGURE 1 with its two tray sections being shown separated slightly to better illustrate the details thereof;

FIGURE 3 is a vertical sectional view taken substantially along the line 3—3 of FIGURE 1, looking in the direction of the arrows, and illustrating how the protector may be fitted around a plant growing in soil;

FIGURE 4 is a fragmentary sectional view taken substantially along the line 4—4 of FIGURE 1, looking in the direction of the arrows, showing how the two sections are fitted telescopically together;

Figure 5:
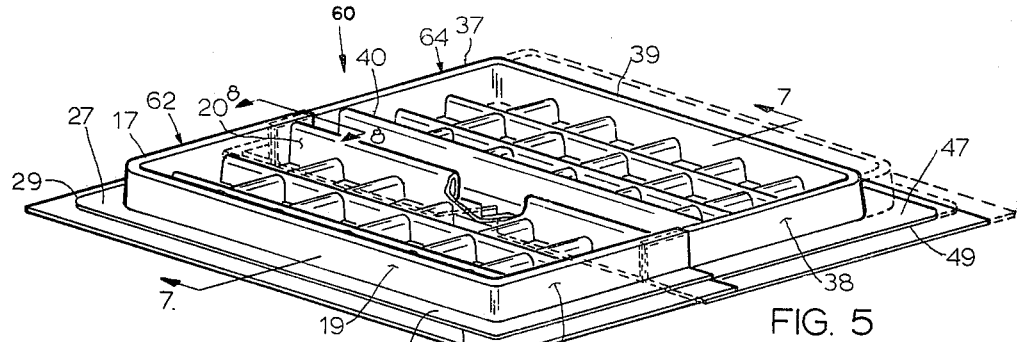
FIGURE 5 is a fragmentary perspective view of a modified form of the invention, wherein the water collecting trays of each section are subdivided into a plurality of compartments or cells, each being provided with its own openings for distributing its collected water to the root section growing therebelow.
Figure 6:
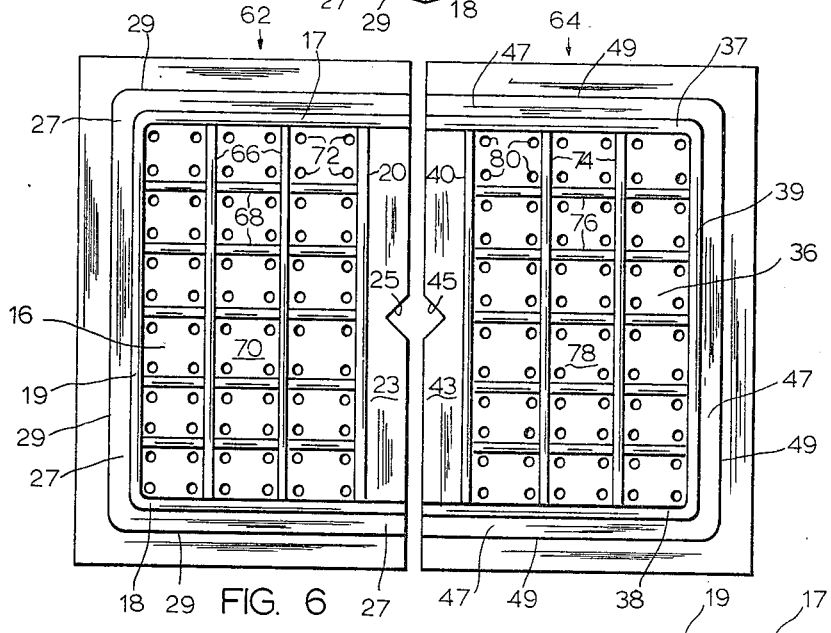
FIGURE 6 is an enlarged top plan view of the plant protector of FIGURE 5 with its two tray sections being shown separated slightly to better illustrate the details thereof.

Referring now to FIGURE 1, there is shown a plant protector 10 consisting of two open-top tray-like sections 12 and 14. The plant protector 10 is preferably made of a relatively inexpensive plastic material that is opaque and has a highly reflective surface. The plastic material must be capable of withstanding the elements of nature, such as the wind, rain, eat and/or cold. It may also be made of impregnated paper, metal, fibre glass and other suitable materials, if desired.

Preferably, the open-top trays 12 and 14 of the plant protector 10 should be formed in separate molds (not shown), wherein one mold is slightly larger than the other in all dimensions corresponding at least to the thickness of the material. This will allow the sides of the trays 12 and 14 to slide easily when their opposing ends have been fitted telescopically together. However, for the sake of economy, the plant protector 10 can be made in a single mold and then separated by cutting along its median transverse axis. Such separated sections fit slidably well enough for the purpose intended since the material of which they are made is extremely thin and has insufficient thickness to present a problem.

The tray section 12 has a flat bottom 16 and upstanding inverted hollow V-shaped side walls 17 and 18 and a back wall 19 formed integrally with said bottom. The tray 12 also has a similarly shaped front wall 20, which extends between the side walls 17 and 18, as best shown in FIGURES 1 and 3. The front wall 20 is set back a substantial distance from the forward ends of the side walls 17 and 18, and is of a height substantially less than the height of said side walls, but this is not critical and it may be made of any height desired. An integrally formed flange 23 extends forwardly of the front wall 20 a distance equal to the setback of said front wall 20 so that its forward edge is in alignment with the forward ends of the side walls 17 and 18. The flange 23 extends forwardly of the front wall 20 in the same plane as the bottom 16 of the tray 12, and has a V-shaped notch 25 whose sides converge inwardly along its median axis.

An integrally formed peripheral flange 27 extends outwardly from the walls 17, 18 and 19, respectively, in substantially the same plane as the bottom 16. The flange 27 has intermediate its ends a depending offset 29, which not only serves to increase its rigidity but also keeps the bottom 16 of the tray 12 spaced slightly above the ground on which it is positioned, allowing for the free circulation of air thereunder.

The bottom 16 of the open top tray 12 is provided with a series of transversely and longitudinally spaced apertures or openings 31, forming means through which its collected water can escape and be distributed quickly and evenly over the ground underneath. During the dry periods, the openings 31 permit air to circulate below the bottom 16.

The tray section 14, being constructed identical to the tray section 12, unless being made in separate molds whereupon one section will be slightly larger than the other, is likewise provided with a flat bottom 36, upstanding inverted hollow V-shaped side walls 37 and 38, a back wall 39 and a front wall 40. The front wall 40 is similarly set back a substantial distance from the forward ends of the side walls 37 and 38, and is of a height substantially less than the height of said side walls 37 and 38, but the height is not critical and is a matter of choice. An integrally formed flange 43 extends forwardly of the front wall 40 a distance equal to the setback of said front wall 40 so that its forward edge is in alignment with the forward ends of the side walls 37 and 38. The flange 43 extends forwardly in the same plane as the bottom 36 of the tray 14, and has a V-shaped notch 45 whose sides converge inwardly along its median axis.

An integrally formed peripheral flange 47 extends outwardly from the walls 37, 38 and 39, respectively, in substantially the same plane as the bottom 16. The flange 47 like the flange 29 has intermediate its ends a depending offset 49, which not only serves to increase its rigidity but also keeps the bottom 36 of the tray 14 spaced slightly above the ground on which it is positioned, allowing for the free circulation of air thereunder.

The bottom 36 of the open top tray 16 is also provided with a series of transversely and longitudinally spaced apertures or openings 51, forming means through which its collected water can escape and be distributed quickly and evenly over the ground underneath. During the dry periods, the openings 51 permit air to circulate below the bottom 36.

Referring now to FIGURES 5 through 8, there is shown a modified form of plant protector 60, which also consists of two open top tray-like sections 62 and 64.

The open top tray section 62 is constructed substantially like the open top tray 12, but differs therefrom in that its open top tray is subdivided by a series of hollow and integrally formed partitioning ribs 66 and 68, which extend transversely and longitudinally, respectively. The partitioning ribs 66 and 68 are evenly spaced and subdivide the tray 62 into a plurality of individual compartments or cells 70 of equal size and shape. The cells 70 are provided with a series of spaced apertures or openings 72 through the bottom 16 through which their collected water may escape to the ground therebelow.

The open top tray section 64 is constructed substantially like the open top tray section 14, but likewise differs therefrom in that its open top tray section is sub-divided by a series of hollow and integrally formed spaced partitioning ribs 74 and 76, which extend transversely and longitudinally, respectively. The partitioning ribs 74 and 76 are evenly spaced and sub-divide the tray 64 into a plurality of individual compartments or cells 78 of equal size and shape. The cells 78 are provided with a series of spaced apertures or openings 80 through the bottom 36 thereof through which their collected water may escape to the ground therebelow.

In the aforementioned modification, it will be obvious that the several partitioning ribs for the open top trays may also be molded solidly and integrally with the trays, or they may be pre-cut and cemented into position when the material from which they are made, such as plastic, impregnated paper or fibre glass, permits such treatment. However, when the protectors are made of metal, such partitioning ribs, if they cannot be formed integrally with the trays, may be soldered or welded into position.

It is to be understood that the number and size of the individual compartments may be varied at will and that the number, size and spacing of the apertures or openings in the bottoms of the trays may likewise be varied at will without departing from the spirit of the invention. While the illustrated modification shows trays having individual compartments or cells of equal size and of a square shape, it will be obvious that they may be made of any desired shape or size. For example, the trays may be sub-divided into compartments or cells of circular shape by forming the partitioning ribs in concentric circles.

Figures 7, 8:
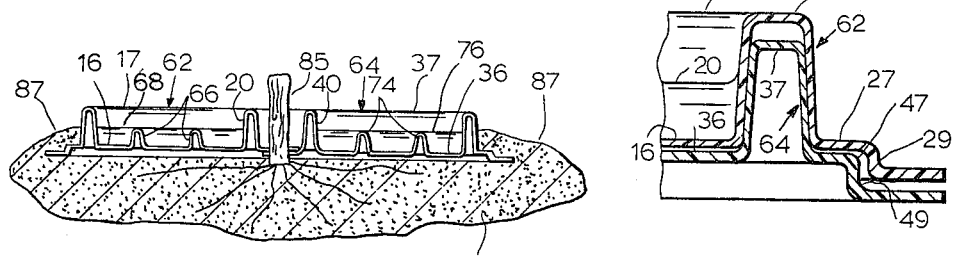
FIGURE 7 is a vertical sectional view taken substantially along the line 7—7 of FIGURE 5 looking in the direction of the arrows, and showing how the protector may be fitted around a plant growing in the soil.
FIGURE 8 is a fragmentary sectional view taken substantially along the line 8—8 of FIGURE 5, looking in the direction of the arrows, showing the manner in which the two sections are fitted telescopically together in a sliding adjustable relationship.

It will be obvious from FIGURES 3 and 7 of the drawings that the plant protectors 10 and 60 have been designed to be positioned around the stems or trunks 85 of new plants or trees as soon as they have obtained sufficient growth to extend sturdily several inches above the ground in which they have been planted.

The protectors 10 and 60 consist of two substantially identical sections, each being surrounded by an outwardly extending peripheral flange. The first section is placed adjacent the plant so that its stem 85 is positioned within the V-shaped notch formed along the median axis of its forward front flange. Then the second section is similarly positioned adjacent the opposite side of the plant and moved into position until the V-shaped notch on its forward front flange overlaps the V-shaped notch of the first section and closely encircles the stem 85. To accomplish this movement when the plants are young and their stems 85 are small, it will be necessary to telescopically superimpose the inverted side walls of one section over the corresponding side walls of its opposite section, as best shown in FIGURES 4 and 8. The sections are slidably telescoped together until the opening formed by the superimposed V-shaped notches closely encircles the stem 85 of the plant or tree.

As the stem 85 grows and gets larger and larger in circumference, it is only necessary to move the two sections outwardly and away from each other a distance sufficient to provide for the increased growth of the stem 85 in the opening formed by the super-imposed V-shaped notches. The distance the two sections may be adjusted telescopically will be dependent upon the depth of the V-shaped notches formed in the forward flanges. Obviously, the plant protectors will be ordered with different kinds and types of plants in mind so that their size and shape will be compatible with the plants with which they are to be used.

It will be noted in FIGURES 3 and 7 that dirt 87 may be used to cover the peripheral flanges extending outwardly from the side and back walls of each section. This procedure will prevent a strong wind from getting under the protector and blowing it off the plant. It will be apparent that the spaced apertures, being of an identical size, will evenly and quickly distribute the water collected by the various open top trays over the ground 89 on which they rest, and that the central area between the opposing front walls of the plant protectors will channel all of its collected water into the opening formed by the opposing V-shaped notches surrounding the stem 85 of the plant or tree.

The plant protectors 10 and 60 not only function to prevent the growth of weeds surrounding the plant, thereby eliminating the high cost of protective weeding, but also protect the tender young plants or trees from erosion of the soil and being washed out during a hard driving rain storm.

Although I have described in detail but two modifications which the invention may assume, it will be readily apparent to those skilled in the art that the invention is not to be so limited, but that various other modifications may be made therein without departing from the spirit thereof or from the scope of the appended claims.

What I claim is:

1. An improved plant protector comprising two sections capable of being telescopically fitted together whereby said sections will be adjustable, each section having a bottom surrounded by raised front, back and side walls forming an open top tray, said bottom having spaced means for distributing its collected water, and each tray section having a peripheral flange extending outwardly from its front, back and side walls, said peripheral flange extending outwardly of said front wall having a notch adapted to receive a stem of a plant when in use.

2. The invention defined in claim 1, wherein the front wall is set back with reference to the forward ends of said side walls and the forward edge of said front flange.

3. The invention defined in claim 1, wherein the notch has inwardly converging sides.

4. The invention defined in claim 1, wherein the notch is along the median axis of said front flange and has inwardly converging sides.

5. The invention defined in claim 1, wherein the peripheral flange extending outwardly of said back and side walls is provided with a depending off-set intermediate its ends.

6. The invention defined in claim 1, wherein the side walls are hollow whereby when said tray sections are brought together with their front flanges in overlapping relationship the forward ends of their side walls will fit slidably and telescopically together.

7. The invention defined in claim 1, wherein the open top trays are sub-divided into a plurality of compartments and each compartment is provided with means for distributing its collected water.

8. The invention defined in claim 1, wherein the open top trays are sub-divided into a plurality of compartments and each compartment is provided with a spaced series of apertures for evenly distributing its collected water over the area of ground covered by said compartment.

References Cited by the Examiner

UNITED STATES PATENTS

| | | | |
|---|---|---|---|
| 1,453,810 | 5/1923 | Sleen | 47—25 |
| 2,822,644 | 2/1958 | Berger | 47—32 |

FOREIGN PATENTS 631,297 10/1949 Great Britain.

ABRAHAM G. STONE, *Primary Examiner.*

P. A. RAZZANO, *Assistant Examiner.*